United States Patent Office 2,907,776
Patented Oct. 6, 1959

2,907,776

HALOGENATION OF 3-KETO STEROIDS

John T. Day, Danville, Pa., assignor to Merck & Co., Inc., Rahway, N.J., a corporation of New Jersey No Drawing. Application November 1, 1956
Serial No. 619,663

13 Claims. (Cl. 260—397.45)

This invention relates to a halogenation process and particularly to an improved process for the halogenation of steroids to produce the corresponding 4-halo-steroid.

This application is a continuation-in-part of my co-pending application, Serial No. 438,618, filed June 22, 1954, now abandoned.

The discovery of the remarkable therapeutic properties of cortisone, hydrocortisone and similar related compounds has stimulated wide interest in finding simpler and more economical methods of preparing such compounds. An important step that usually occurs near the end of the long and involved synthesis of these hormones is the introduction of a double bond between the 4 and 5 carbon atom in the cyclopentanopolyhydrophenanthrene nucleus. One method of introducing this double bond has been the halogenation of 3-keto steroids at the 4 position followed by formation of the semicarbazone and the $\Delta^4$ double bond and then regeneration of the free ketone. This method has proven very effective and has therefore led to the development of various methods of halogenating the 4-position of steroids. Considerable effort on the part of the steroid chemists has been expended over a period of years in an effort to improve the yield and quality of these halogenated products. Variations in reaction conditions such as time, temperature and mode of addition of reactants have increased the yield of pure products by small increments to approximately 70%. In order to achieve such a yield it has been necessary to treat a solution of the steroid in acetic acid with an equimolar amount of bromine in the presence of a small quantity of hydrogen bromide as a catalyst.

The halogenation reaction is a nonselective one and as such is subject to certain disadvantages with consequent complications in operations and handling and a relatively low yield. The disadvantages are apparent, considering that this step occurs nearly at the end of a long and involved synthesis which requires the employment of expensive starting material, a multiplicity of chemical equipment, reagents and solvents. It is obvious therefore that any increase in yield or simplification of operations at this point in the synthesis of the various halogenated steroids is extremely advantageous.

A primary object of the present invention is to provide an improved process for the production of 4-halo-3-ketopregnanes of the normal series, in which the hydrogen atom attached to the 5-carbon atom is in the beta position. A related object is to provide such a process which will result in nearly quantitative yields of 4-halo-3-ketopregnanes. Other objects and the advantages of this invention will be apparent from the detailed description hereinafter provided.

According to the present invention, it has been discovered that 4-halo-3-ketopregnane compounds of the normal series having a $5\beta$ hydrogen atom may be prepared in approximately quantitative yield by carrying out the halogenation of 3-ketopregnane compound at a temperature lower than $-30°$ C. and preferably from about $-40°$ C. to about $-70°$ C. Surprisingly, it has been found that quantitative yields of 4-halo pregnane compounds are obtained and no halogenation at positions other than at the 4 position occurs when the temperature is maintained below $-30°$ C. This discovery provides a simple, effective and economical method for the production of 4-halo-3-ketosteroids in very high yields. It also permits the recovery of a product in a high degree of purity by substantially eliminating the formation of undesirable by-products, such as, the 2-halo and 2,4-dihalo-derivatives.

The starting materials for the process of the invention are the 3-ketosteroids and particularly the 3-ketopregnanes such as $17\alpha$-hydroxy-3-ketopregnanes. The starting materials have a 4-methylene group; i.e. they are unsubstituted at the 4 position. The process can also be applied effectively to these steroids containing other functional substituents attached to the steroid nucleus. Thus, keto groups may be present such as at the 11 and 20 positions, hydroxy groups at the 11, 17 and 21 positions and acyloxy groups such as at the 21 position. Representative of such steroids which may be converted to the corresponding 4-halo-3-ketosteroids by this invention are pregnane-$17\alpha,21$ - diol - $3,11,20$ - trione - $21$ - acetate; pregnane-$17\alpha,21$ - diol - $3,20$ - dione - $21$ - acetate; pregnane - $21$ - ol - $3,20$ - dione - $21$ - acetate; pregnane - $21$ - ol-$3,11,20$-trione - $21$ - acetate; pregnane - $11\beta,17,21$ - triol - $3,20$ - dione - $21$ - acetate; pregnane - $3,11,20$ - trione; pregnane - $3,20$ - dione; pregnane - $11,17,20,21$ - tetraol - $3$ - one; pregnane - $17,20,21$ - triol - $3$ - one; pregnane - $11\alpha,17\alpha$ - diol - $3,20$ - dione; pregnane - $17\alpha,20,21$ - triol - $3$ - one - $20,21$ - diacetate; and pregnane - $17\alpha,21$ - diol - $3,11,20$ - trione - $21$ - benzoate.

The halogenating agent is a halogen of atomic weight 35 or 80, consisting of chlorine and bromine. The halogenation is preferably carried out by dissolving or suspending the steroid in a solvent, such as a polar organic solvent. Typical examples of suitable solvents are methylene chloride, ethylene dichloride, chloroform, isopropanol, acetonitrile, and mixtures of solvents such as acetic acid-chloroform, methylene dichloride-acetic acid, ethylene dichloride-acetic acid, isopropanol-acetonitrile-acetic acid, acetonitrile-acetic acid and acetic acid-acetic anhydride.

It is usually desirable to add a catalyst to the reaction mixture to promote the rate of reaction. The halogenation catalyst must be one which is operative at the low temperatures of this invention. The most common of these is hydrogen bromide. The catalyst is usually used in 10 to 120 mole percent of the steroid.

The halogenating agent may be supplied to the reaction mixture in any suitable manner. It is preferred to add an equimolar quantity of halogen. Precise control of the amount of halogen is not necessary, however, as the only halogenation reaction occurring at temperatures below $-40°$ C. is at the 4 position. No halogenation occurs at other positions, even when excess halogen is present.

In a preferred mode of operation a 3-keto-pregnane is dissolved in a mixture of chloroform and acetic acid and cooled to $-50°$ C. Thereafter approximately 10 mole percent of hydrogen bromide in acetic acid is added followed by the addition of about 100 mole percent each of bromine and hydrogen bromide in acetic acid. It is understood that other modes of operation may also be used. The reaction temperature is maintained in a range of $-40°$ to $-70°$ C. Under these conditions the reaction is complete in about one hour.

Upon completion of the reaction, it is desirable to neutralize the hydrogen bromide formed with a base such as sodium acetate or sodium bicarbonate. It is also desirable to discharge any excess bromine which remains unreacted with a reducing agent such as sodium bisulfite.

The following examples are given for the purpose of illustration.

Example 1

A solution of 100 g. (0.2478 mole) of pregnane-17α, 21-diol-3,11,20-trione-21-acetate in 280 ml. of acetic acid and 2250 ml. of choloroform is cooled to −55° C. A solution of 0.248 mole hydrogen bromide and 0.2402 mole of bromine in 248 ml. of acetic acid is added over a period of 60 minutes while maintaining the temperature at −55° to −60° C. The color disappears after an additional 45 minutes at −65° C. The reaction mixture is agitated with a solution of 40.25 g. of sodium acetate in 333 cc. of water. The chloroform is removed by distillation under reduced pressure. Water is added to a final volume of 4.5 l. The slurry is aged at 0° C. for 60 minutes, filtered and the filter cake washed free of acid and salts with water. The product, 4-bromo-pregnane-17α,21-diol-3,11,20-trione-21-acetate, having a rotation of $[\alpha]_D^{25°}$ plus 101.5° (acetone), is recovered in 98.2 percent yield.

Example 2

A solution of 100 g. (0.2478 mole) of pregnane-17α, 21-diol-3,11,20-trione-21-acetate in 1000 ml. of isopropanol and 1500 ml. of acetonitrile is cooled to −40° C. A solution of 0.496 mole of hydrogen bromide and 0.247 mole of bromine in 465 ml. of acetic acid is added over a period of 60 minutes while maintaining the temperature of the solution at −40° C. The procedure described in Example 1 is then followed yielding 95.1% of 4-bromo-pregnane-17α,21-diol-3,11,20-trione-21-acetate having a rotation of $[\alpha]_D^{25°}$ plus 100.40 (acetone).

Example 3

A solution of 100 g. (0.2478 mole) of pregnane-17α, 21-diol-3,11,20-trione-21-acetate in 1995 ml. of acetic acid-acetronitrile is cooled to −40° C. A solution of 0.052 mole of hydrogen bromide and 0.24 mole of bromine in 300 ml. of acetonitrile-acetic acid is added over a period of 60 minutes while maintaining the temperature of the solution at −40° C. The procedure described in Example 1 is then followed yielding 95.6% of 4-bromo-pregnane-17α,21-diol-3,11,20-trione-21-acetate.

Example 4

The procedure of Example 1 is followed except that chlorine is used in place of the bromine. The resulting product 4-chloro-pregnane-17α,21-diol-3,11,20-trione-21-acetate is obtained in equally high yield.

Example 5

Following the procedure given in Example 1, relatively pure 4-bromo-pregnane-17α,21-diol-3,20-dione-21-acetate is prepared in high yield by the bromination of pregnane-17α,21-diol-3,20-dione-21-acetate.

Example 6

Following the procedure given in Example 1, relatively pure 4-bromo-pregnane-11β,17α,21-triol-3,20-dione-21-acetate is prepared in high yield by the bromination of pregnane-11,17α,21-triol-3,20-dione-21-acetate.

Example 7

Following the procedure given in Example 1, relatively pure 4-bromo-pregnane-17α-ol-3,11,20-trione is prepared in high yield by the bromination of pregnane-17α-ol-3,11,20-trione.

Example 8

Following the procedure given in Example 1, relatively pure 4-bromo-pregnane-11α,17α,21-triol-3,20-dione-21-acetate is prepared in high yield by the bromination of pregnane-11α,17α,21-triol-3,20-dione-21-acetate.

Example 9

Following the procedure given in Example 1, relatively pure 4-bromo-pregnane-21-ol-3,11,20-trione-21-acetate is prepared from pregnane 21-ol-3,11,20-trione-21-acetate.

Any departure from the above description which conforms to the present invention is intended to be included within the scope of the claims.

What is claimed is:

1. In a process for the halogenation of a 17α-hydroxy-3-ketopregnane of the normal series which is unsubstituted at the 4 position to introduce a halogen atom into the 4-position thereof by reacting the 17α-hydroxy-3-ketopregnane with a halogen of atomic weight from 35 to 80, the step of conducting the halogenation at a temperature lower than −30° C. in the presence of a hydrogen bromide catalyst.

2. In a process for the bromination of a 17α-hydroxy-3-ketopregnane of the normal series which is unsubstituted at the 4 position to introduce a bromine atom into the 4-position thereof by reacting the 17α-hydroxy-3-ketopregnane with bromine, the step of conducting the bromination at a temperature of about −40° C. to about −70° C. in the presence of a hydrogen bromide catalyst.

3. In a process for the chlorination of a 17α-hydroxy-3-ketopregnane of the normal series which is unsubstituted at the 4 position to introduce a chlorine atom into the 4-position thereof by reacting the 17α-hydroxy-3-ketopregnane with chlorine, the step of conducting the chlorination at a temperature of about −40° C. to about −70° C. in the presence of a hydrogen bromide catalyst.

4. A process for the production of a 4-halo-17α-hydroxy-3,20-diketopregnane of the normal series which comprises reacting together approximately equimolar amounts of a 17α-hydroxy-3,20-diketopregnane which is unsubstituted at the 4 position and a halogen of atomic weight from 35 to 80 in the presence of a solvent and a hydrogen bromide halogenation catalyst at a temperature of about −40° C. to about −70° C.

5. A process for the production of a 4-halopregnane-17α,21-diol-3,11,20-trione 21-acetate, which comprises reacting together approximately equimolar amounts of pregnane-17α,21-diol-3,11,20-trione 21-acetate and a halogen of atomic weight from 35 to 80 in the presence of a solvent and a hydrogen bromide halogenation catalyst at a temperature of about −40° C. to about −70° C.

6. A process for the production of a 4-halopregnane-17α,21-diol-3,20-dione 21-acetate, which comprises reacting together approximately equimolar amounts of pregnane-17α,21-diol-3,20-dione 21-acetate and a halogen of atomic weight from 35 to 80 in the presence of a solvent and a hydrogen bromide halogenation catalyst at a temperature of about −40° C. to about −70° C.

7. A process for the production of a 4-halopregnane-11β,17α,21-triol-3,20-dione 21-acetate, which comprises reacting together approximately equimolar amounts of pregnane-11β,17α,21-triol-3,20-dione 21-acetate and a halogen of atomic weight from 35 to 80 in the presence of a solvent and a hydrogen bromide halogenation catalyst at a temperature of about −40° C. to about −70° C.

8. A process for the production of a 4-halopregnane-17α-ol-3,11,20-trione, which comprises reacting together approximately equimolar amounts of pregnane-17α-ol-3,11,20-trione and a halogen of atomic weight from 35 to 80 in the presence of a solvent and a hydrogen bromide halogenation catalyst at a temperature of about −40° C. to about −70° C.

9. A process for the production of a 4-halopregnane-21-ol-3,11,20-trione 21-acetate, which comprises reacting together approximately equimolar amounts of pregnane-21-ol-3,11,20-trione 21-acetate and a halogen of atomic weight from 35 to 80 in the presence of a solvent and a hydrogen bromide halogenation catalyst at a temperature of about −40° C. to about −70° C.

10. The process of claim 4 wherein the solvent is a mixture of acetic acid and chloroform.

11. The process of claim 4 wherein the solvent is a mixture of isopropanol, acetonitrile and acetic acid.

12. The process of claim 4 wherein the solvent is a mixture of acetonitrile and acetic acid.

13. The process of claim 4 wherein the catalyst is hydrogen bromide and the halogen is bromine.

References Cited in the file of this patent

UNITED STATES PATENTS

| | | |
|---|---|---|
| 2,681,353 | Archer | June 15, 1954 |
| 2,684,963 | Schock et al. | July 27, 1954 |
| 2,705,237 | Djerassi et al. | Mar. 29, 1955 |
| 2,773,059 | Magerlein et al. | Dec. 4, 1956 |
| 2,802,840 | Djerassi et al. | Aug. 13, 1957 |